(12) United States Patent
Mohr et al.

(10) Patent No.: US 9,067,392 B2
(45) Date of Patent: *Jun. 30, 2015

(54) MEMBRANE FILE FOR BATTERIES, HAVING A SHUT-OFF FUNCTION

(75) Inventors: Thilo Mohr, Homburg (DE); Detlef Busch, Saarlouis (DE); Bertram Schmitz, Saargemunies (FR); Christian Peters, St. Ingbert (DE)

(73) Assignee: Treofan Germany GmbH & Co. KG (DE)

( * ) Notice: Subject to any disclaimer, the term of this patent is extended or adjusted under 35 U.S.C. 154(b) by 906 days.

This patent is subject to a terminal disclaimer.

(21) Appl. No.: 12/990,228

(22) PCT Filed: Apr. 23, 2009

(86) PCT No.: PCT/EP2009/002960
§ 371 (c)(1),
(2), (4) Date: Nov. 23, 2010

(87) PCT Pub. No.: WO2009/132801
PCT Pub. Date: Nov. 5, 2009

(65) Prior Publication Data
US 2011/0064989 A1  Mar. 17, 2011

(30) Foreign Application Priority Data
May 2, 2008 (DE) .......................... 10 2008 021 995

(51) Int. Cl.
B32B 27/32 (2006.01)
H01M 2/16 (2006.01)

(52) U.S. Cl.
CPC ......... *B32B 27/32* (2013.01); *Y10T 428/24942* (2015.01); *H01M 2/1653* (2013.01); *H01M 2/1686* (2013.01)

(58) Field of Classification Search
CPC .... H01M 2/14; H01M 2/1653; H01M 2/1686
USPC ................................................. 429/142, 144
See application file for complete search history.

(56) References Cited

U.S. PATENT DOCUMENTS

| 5,231,126 A | 7/1993 | Shi et al. |
| 5,594,070 A | 1/1997 | Jacoby et al. |
| 5,641,565 A * | 6/1997 | Sogo ........................... 428/315.7 |
| 6,838,042 B1 | 1/2005 | Wieners et al. |
| 2007/0207376 A1 * | 9/2007 | Call et al. ....................... 429/129 |
| 2007/0264578 A1 | 11/2007 | Ozaki et al. |
| 2007/0269719 A1 * | 11/2007 | Sadamitsu et al. ............ 429/249 |
| 2009/0041965 A1 * | 2/2009 | Kochem et al. ............... 428/36.5 |

FOREIGN PATENT DOCUMENTS

| DE | 3610644 A1 | 10/1986 | |
| DE | 4420989 A1 | 12/1995 | |
| DE | 19949898 A1 | 5/2001 | |
| EP | 0550262 A1 | 7/1993 | |
| EP | 0557721 A2 | 9/1993 | |
| EP | 0668156 A1 | 8/1995 | |
| EP | 0967671 A2 | 12/1999 | |
| EP | 1047141 A2 | 10/2000 | |
| WO | WO2006/099990 * | 9/2006 | .............. B32B 27/32 |
| WO | WO-2006/099990 A1 | 9/2006 | |
| WO | WO-2007/051103 A2 | 5/2007 | |
| WO | WO2007051103 * | 5/2007 | ................ B32B 5/04 |

OTHER PUBLICATIONS

Arora, P. and Zhang, Z., "Battery Separators," Chem. Rev. 2004, vol. 104, pp. 4419-4462.
Zheng, Q., et al., "Structure, morphology and non-isothermal crystallization behavior or polypropylene catalloys," Polymer, 2005, vol. 46, pp. 3163-3174.
U.S Appl. No. 12/990,232, filed Oct. 29, 2010, Peters et al.
U.S. Appl. No. 12/990,238, Oct. 29, 2010, Mohr et al.
Laman, F.C., et al., "Impedance Studies for Separators in Rechargeable Lithium Batteries," *J. Electrochem. Soc.*, Apr. 1993, vol. 140, No. 4, pp. L51-L53.

* cited by examiner

*Primary Examiner* — Ula C Ruddock
*Assistant Examiner* — Archer Dudley
(74) *Attorney, Agent, or Firm* — Drinker Biddle & Reath LLP

(57) ABSTRACT

The invention relates to a biaxially oriented microporous film composed of at least two coextruded layers encompassing an external shut-off layer and another layer, wherein both layers contain a mixture of propylene homopolymer and propylene block copolymer and β-nucleation agent. The propylene block copolymer I of the other layer has a melting point exceeding 140° C. and the propylene block copolymer II of the external shut-off layer has a melting range starting at a temperature ranging from 50 to 120° C. The melting point of the propylene block copolymer I is greater than the melting point of the propylene block copolymer II. The film can be used as a separator in a primary or secondary battery.

21 Claims, No Drawings

MEMBRANE FILE FOR BATTERIES, HAVING A SHUT-OFF FUNCTION

CROSS-REFERENCE TO RELATED APPLICATIONS

This application is a national stage application (under 35 U.S.C. §371) of PCT EP2009/002960, filed Apr 23, 2009, which claims benefit of German application 10 2008 021 995.9, filed May 2, 2008.

BACKGROUND OF THE INVENTION

The present invention relates to a microporous film and the use thereof as a separator in batteries.

Modern devices require an energy source, such as primary or secondary batteries, which enable them to be used irrespective of their spatial context. The disadvantage of primary batteries is that they have to be disposed of. As a result, an increasing number of storage (secondary) batteries are being used, which can be charged up again and again using a mains battery charger. Nickel-cadmium batteries (NiCd batteries), for instance, can achieve a service live of approximately 1000 charge cycles if used correctly.

Primary and secondary batteries always consist of two electrodes, which are immersed in an electrolyte solution, and a separator, which separates the anode from cathode. The different types of secondary battery are distinguished by the electrode material used, the electrolyte and the separator used. During charging, a current flows through the battery. The flow of current triggers an electrochemical reaction at the electrodes. Once the battery is charged, it can supply current until the chemical reaction, which is the reverse of the charging process, is exhausted.

The purpose of a battery separator is to provide a spatial division between the anode and cathode in primary batteries and the negative and positive electrode in storage batteries. The separator must be a barrier that isolates the two electrodes from one another electrically, in order to avoid short-circuits. At the same time, however, the separator must be permeable to ions, so that electro-chemical reactions can take place in the cell.

A battery separator must be thin, so that the internal resistance is as low as possible and a high packing density can be achieved. This is the only way of achieving good performance data and high capacities. In addition, it is necessary for the separators to absorb the electrolyte and guarantee ion exchange when the cells are full. Whereas such things as fabric were used previously, nowadays predominantly fine-pored materials such as non-woven fabrics and membranes are used.

Just as there are different battery systems, the separators used in them must differ too, e.g. according to the electrolyte to which they are exposed during their service life. A further criterion for the choice of separator is price. Separators that remain stable over many charge and discharge cycles are made from higher-grade materials than those used in cheaper disposable batteries.

The occurrence of short-circuits is a problem, particularly in lithium batteries. In the case of thermal loading, the battery separator may melt in lithium ion batteries, leading to a short-circuit with disastrous consequences. Similar risks exist if the lithium batteries suffer mechanical damage or are over-charged due to a defect in the charger's electronic system.

In order to increase the safety of lithium ion batteries, shut-down membranes were developed in the past. These special separators close their pores in the shortest time at a given temperature, which is significantly lower than the melting point or ignition point of lithium. The catastrophic consequences of a short-circuit in lithium batteries are thereby largely avoided.

At the same time, though, the separators also need to have a high mechanical strength, which is guaranteed by materials with high melting temperatures. Hence, for instance, polypropylene membranes are advantageous due to their good puncture resistance, but polypropylene's melting point of around 164° C. is very close to lithium's flash point (170° C.)

The prior art discloses how polypropylene membranes can be combined with further layers, which are constructed from materials with a lower melting point, such as polyethylene. Such modifications of the separators must not, of course, have a detrimental effect on the other properties, such as porosity, or provide an added impediment to ion migration. However, the inclusion of polyethylene layers has a very negative effect on the permeability and mechanical strength of the separator overall. In addition, the adhesion of the polyethylene layers to polypropylene is problematic, with the result that only selected polymers in these two classes can be coextruded.

BRIEF SUMMARY OF THE INVENTION

The problem addressed by the present invention involved providing a separator for batteries which displayed a shut-off function and outstanding mechanical strength. Furthermore, the membrane should be capable of being manufactured using a simple, cost-effective method.

The problem addressed by the invention is solved by a biaxially oriented microporous film composed of at least two coextruded layers encompassing at least one external shut-off layer and another layer, wherein all layers contain a mixture of propylene homopolymer and propylene block copolymer and β-nucleation agent and wherein the propylene block copolymer I of the other layer has a melting point exceeding 140° C. and the propylene block copolymer II of the external shut-off layer has a melting range starting at a temperature ranging from 50 to 120° C. and wherein the melting point of the propylene block copolymer I is greater than the melting point of the propylene block copolymer II.

DETAILED DESCRIPTION OF THE INVENTION

Surprisingly, the film according to the invention displays both very good mechanical strength and the desired shut-off function when used as a separator. The film's gas permeability is significantly reduced when the film is exposed to a greater temperature. For example, the Gurley value rises by at least 30% (relative to the original value), preferably by 40 to 80%, after one minute's heat treatment at 130° C. The film according to the invention generally displays a Gurley value of at least 6000 secs, preferably 10,000 to 500,000 secs, particularly 15,000 to 100,000 secs, after this heat treatment (1 min @ 130° C.). Consequently, with its use according to the invention as a separator in batteries, the consequences of a short-circuit can be effectively averted. If higher temperatures occur inside the battery as a result of a short-circuit, the pores in the separator are closed by adding the special block copolymer II in the internal layer or internal layers in a short time, so that a further passage of gases or ions is prevented and the chain reaction interrupted.

All layers of the film contain as the main components a propylene homopolymer and propylene block copolymer with the melting point chosen in each case or the respective melting properties and at least one β-nucleation agent, as well as small quantities of other polyolefins if necessary, insofar as they do not have a detrimental effect on the porosity and other main properties and, if necessary, the usual additives, such as stabilisers, neutralisation agents and/or incompatible particles in the effective amounts in each case.

In general, each of the layers contains 50 to 90% by wt, preferably 50 to 80% by wt, particularly 55 to 75%, propylene homopolymer and 10-50% by wt propylene block copolymer, preferably 20 to 50% by wt, particularly 25 to 45% by wt and 0.001 to 5% by wt, preferably 50-10,000 ppm of at least one β-nucleation agent, relative to the weight of the layer concerned. In the event that further polyolefins should be contained in the layer or layers, the proportion of the propylene homopolymer is reduced accordingly. In general, the quantity of additional polymers amounts of 0 to <30% by wt, preferably 0 to 20% by wt, particularly 0.5 to 5% by wt, if these are also contained. In the same way, it is also true that the aforementioned proportion of propylene homopolymer is reduced when higher quantities of up to 5% by wt nucleation agent are used. The proportions of the individual components may be identical or different in all layers and chosen independently of one another in principle.

Suitable propylene homopolymers contain 98 to 100% by wt, preferably 99 to 100% by wt propylene units and have a melting point (DSC) of 150° C. or higher, preferably 150 to 170° C., and in general a melt flow index of 0.5 to 10 g/10 min, preferably 2 to 8 g/10 min, at 230° C. and a force of 2.16 kg (DIN 53735). Isotactic propylene homopolymers with an n-heptane-soluble proportion of less than 15% by wt, preferably 1 to 10% by wt, are preferred propylene homopolymers for the layer. Advantageously, isotactic propylene homopolymers with a high chain isotacticity of at least 96%, preferably 97-99% ($^{13}$C-NMR; triad method), are used. These raw materials are known as HIPP (high isotactic polypropylene) or HCPP (high-crystalline polypropylene) polymers in the state of the art and are characterised by a high stereoregularity of the polymer chains, higher crystallinity and a higher melting point, compared with propylene polymers with $^{13}$C-NMR isotacticity of under 96%, preferably 92 to 95%, which can also be used ($^{13}$C-NMR; triad method).

The propylene block copolymers used in each layer contain predominantly, i.e. over 50% by wt, preferably 70 to 99% by wt, particularly 90 to 99% by wt, propylene units. Suitable comonomers in corresponding amounts, for example, <50% by wt; 1 to 30% by wt; 1 to 10% by wt, are ethylene, butylene or higher alkene homologues, among which ethylene is preferred.

The film according to the invention is characterised in that at least one external shut-off layer contains a special block copolymer II, which is different from the block copolymer I of the other layer. This block copolymer II displays a different melting behaviour to the block copolymer I in the other layer. The composition of the external shut-off layer causes the pores to close at higher temperatures, so that the permeability of the microporous film is significantly reduced. This external layer is therefore also referred to as the shut-off layer. In contrast, the other layer containing the block polymer I does not have this shut-off function.

It is fundamental to the invention that the melting point of the block copolymer I in the other layer is higher than the melting point of the block copolymer II in the external shut-off layer. The melting point of the block copolymer II of the external layer is generally lower than 150° C., preferably ranging from 100 to 145° C. Block copolymers with a higher melting point of over 150° C. in the external layer do not generally lead to a closure of the pores at temperatures below the flashpoint of lithium in the desired way, particularly not quickly enough.

In addition, it is essential for the block copolymer II to begin to melt at comparatively low temperatures, i.e. the melting range according to DSC starts at a temperature ranging from 50 to 120° C., preferably 50 to 110° C., the melting range particularly begins at 55 to 100° C. This means that the start of the melting range is a given temperature that lies within the aforementioned temperature ranges and characterises the start of the melting process.

Surprisingly, the addition of what is in this context a low-melting block copolymer II does not adversely affect the film in the expected manner. The films nevertheless display good mechanical strength. A higher comonomer content, preferably ethylene content, is preferred for the block copolymers II and generally lies between 10 and 50% by wt, preferably 10 and 25% by wt. The melt flow index of the block copolymers II generally ranges from 0.1 to 10 g/10 min, preferably 0.3 to 5 g/10 min.

Furthermore, it is essential for the block copolymer I of the other layer to have a melting point exceeding 140 to 170° C., preferably from 150 to 165° C., particularly 150 to 160° C. The melting range of these block copolymers I generally begins at over 120°, preferably in the range 125-140° C. For block copolymers I, a low comonomer content, preferably ethylene content, is preferred and usually lies between 1 and 20% by wt, preferably 1 and 10% by wt. Block copolymer I usually contains less comonomer, preferably ethylene, than block copolymer II. The melt flow index of block copolymer I usually ranges from 1 to 20 g/10 min, preferably 1 to 10 g/10 min.

The "melting point" and "start of the melting range" parameters are determined by means of DSC measurement and calculated from the DSC curve, as described in the measuring methods.

If necessary, each layer of film (internal and external layers) may also contain other polyolefins in addition to the propylene homopolymer and propylene block copolymer. The proportion of these other polyolefins is usually less than 30% by wt, preferably ranging from 1 to 10% by wt. Other polyolefins are, for example, static copolymers of ethylene and propylene with an ethylene content of 20% by wt or less, statistical copolymers of propylene with $C_4$-$C_8$ olefins with an olefin content of 20% by wt or less, terpolymers of propylene, ethylene and butylene with an ethylene content of 10% by wt or less and with a butylene content of 15% by wt or less, or polyethylene, such as HDPE, LDPE, VLDPE, MDPE and LLDPE.

All known additives are suitable in principle for use as β-nucleation agents for the microporous layers, said additives promoting the formation of β-crystals of the polypropylene when a polypropylene melt cools down. Such β-nucleation agents, and also their mode of action in a polypropylene matrix, are known per se in the state of the art and are described in detail below.

Various crystalline phases of polypropylene are known in the art. While a melt cools down, it is predominantly the α-crystalline PP that forms, the melting point of which is around 158-162° C. By means of a particular temperature control, a small proportion of β-crystalline phase can be produced during cooling, which has a significantly lower melting point of 148-150° C. compared with the monoclinal α-modification. Additives that produce a greater proportion of the β-modification during cooling of the polypropylene are known in the state of the art, for example γ-quinacridone, dihydroquinacridine or calcium salts of phthalate acid.

For the purposes of the present invention, highly active β-nucleation agents are preferably used, which produce a β-proportion of 40-95%, preferably 50-85% (DSC), during cooling of the melt film. An example of what is suitable for this is a dual-component nucleation system made of calcium carbonate and organic dicarbonic acids, which is described in DE 3610644, to which specific reference is made here. Particularly advantageous are calcium acids of the dicarbonic acids, such as calcium pimelate or calcium suberate, as described in DE 4420989, to which specific reference is likewise made. The dicarboxamides described in EP-0557721, particularly N,N-dicyclohexyl-2,6-naphthalene dicarboxamides, are suitable β-nucleation agents.

In addition to the nucleation agents, compliance with a particular temperature range and dwell times at these temperatures during cooling of the melt film is important for achieving a high proportion of β-crystalline polypropylene. Cooling of the melt film preferably takes place at a temperature of 60 to 130° C., particularly 80 to 120° C. A slow cool-down likewise promotes growth of β-crystallites, consequently, the draw-off speed, i.e. the speed at which the melt film runs over the first cooling roll should be slow, so that the necessary dwell times at the chosen temperatures are sufficiently long. The take-off speed is preferably less than 25 m/min, particularly 1 to 20 m/min.

Particularly preferred embodiments of the microporous film according to the invention contain 50 to 10,000 ppm, preferably 50 to 5000 ppm, particularly 50 to 2000 ppm, calcium pimelate or calcium suberate in the respective layer.

The microporous membrane film is multi-layered and includes at least one external layer and another layer with the composition described earlier, which has no such shut-off function. Where appropriate, the membrane film may be two-layered, in which case it comprises only an external shut-off layer and another layer. The membrane film preferably comprises 3 layers, wherein the external shut-off layers on both sides are applied to the other layer, which then forms the film's central inner base layer. In a further embodiment, the film may comprise four or five layers, wherein at least one external layer is combined with a central base layer and one or two-sided intermediate layer(s) and another external layer without a shut-off function. The additional internal layer(s) is/are preferably designed without a shut-off function, as in the case of the other layer described earlier. The base layer may correspond to both the external shut-off layer and the other layer in terms of its composition. In the context of the present film, the base layer is understood to be the layer with the greatest thickness. The base layer is an internal, central layer, except in the case of two-layered embodiments.

In a further four and five-layered embodiment, the external shut-off layer is combined with a central base layer and one or two-sided intermediate layer(s) and a second external shut-off layer. Here too, the additional intermediate layer(s) is/are preferably designed without a shut-off function, as in the case of the other layer described earlier. The base layer may likewise correspond to both the external shut-off layer and the other layer without a shut-off function in terms of its composition.

In all these embodiments, several shut-off layers and several other layers need not necessarily have an identical composition, but instead correspond to the general description for these layers in terms of their composition. The thickness of the membrane film usually ranges from 15 to 100 μm, preferably 20 to 80 μm. The external shut-off layer generally has a thickness of 3 to 30 μm, preferably 5 to 20 μm, particularly 7 to 15 μm. The thickness of the other layer is generally 0.5 to 30 μm, preferably 1 to 25 μm. The thicknesses of the additional layers may vary across a broad range, in order to adjust the desired total thickness of the membrane film.

The microporous film may receive corona, flame or plasma treatment, in order to improve the electrolyte filling.

The density of the macroporous membrane film usually ranges from 0.2 to 0.6 g/cm$^3$, preferably 0.3 to 0.5 g/cm$^3$. For the film to be used as a separator in batteries, it should have a Gurley value of 100 to 5000 secs, preferably 500 to 2500 secs. Of course this is the film's Gurley value before heat treatment. The film's bubble point should not exceed 350 nm, preferably 50 to 300 nm, and the average pore diameter should range from 50 to 100 nm, preferably 60 to 80 nm.

In the context of the present invention, the term "shut-off function" is taken to mean reduced gas permeability under the influence of a higher temperature. The film according to the invention displays this shut-off function due to the internal shut-off layer. The film's Gurley value is increased by at least 30%, preferably by 40-80%, compared with the original value, if the film is exposed to a temperature of 130° C. for one minute. The film according to the invention generally displays a Gurley value of at least 600 secs, preferably 10,000 to 500,000 secs, particularly 15,000 to 100,000 secs, after this heat treatment (1 min @ 130° C.). The value is determined in principle using the method described for establishing gas permeability, in which this measurement is taken before and after the film has been subjected to a temperature load.

The porous film according to the invention is preferably produced according to the coextrusion process known per se.

The procedure followed in the context of this process is such that the mixtures of propylene homopolymer, propylene block copolymer I or II and β nucleation agent in the respective layers are melted in extruders and coextruded through a flat-film extrusion die onto a draw-off roller, on which the multi-layered melt film solidifies and cools, forming β-crystallites. The cooling temperatures and cooling times are chosen in such a way that the highest possible proportion of β-crystalline polypropylene is produced in the precursor film. This precursor film with a high proportion of β-crystalline polypropylene is then stretched biaxially in such a way that the β-crystallites are converted into α-polypropylene during stretching. The biaxially stretched film is then thermofixed and if necessary corona-, plasma- or flame-treated on one surface.

The biaxial stretching (orientation) is generally carried out in sequence, wherein the stretching is preferably longitudinal (in the machine direction) to begin with and then transverse (perpendicular to the machine direction).

The draw-off roller or draw-off rollers are kept at a temperature of 60 to 130° C., preferably 90 to 120° C., to promote the formation of a high proportion of β-crystalline polypropylene.

During stretching in the longitudinal direction, the temperature is less than 140° C., preferably 80 to 120° C. The longitudinal stretch ratio ranges from 2.0:1 to 5:1. Stretching in a transverse direction takes place at a temperature of under 140° C. and should be chosen so that the transverse stretching temperature lies below the melting point of the propylene block copolymer II in the internal layer. The transverse stretch ratio lies in the range 2.5:1 to 7.5:1.

Longitudinal stretching is advantageously carried out with the help of two different fast-running rollers corresponding to the desired stretch ratio and transverse stretching with the help of a corresponding clip frame.

The biaxial stretching of the film is generally followed by its thermofixing (heat treatment), wherein the film is kept at a temperature of 110 to 130° C. for roughly 0.5 to 10 secs. The film is then rolled up in the customary fashion using a roll-up mechanism.

As mentioned above, if necessary a surface of the film is corona-, plasma- or flame-treated according to one of the known methods after biaxial stretching.

The following measuring methods were used to characterise the raw materials and films.

Melt Flow Index

The melt flow index of the propylene polymers and propylene-block copolymer was measured according to DIN 53 735 at a load of 2.16 kg and 230° C. and at 190° C. and 2.16 kg for polyethylene.

Melting Points and Start of the Melting Range

Part-crystalline thermoplastic polymers such as propylene polymers, for example, do not have a set melting point, on account of the different crystalline ranges or phases. Instead, they have a melting range. The melting point and melting range are therefore values that are derived from a DSC curve for the respective polymer in a precisely defined manner. In the case of the DSC measurement, a quantity of heat per unit of time is supplied to the polymer with a defined heating rate and the flow of heat is plotted against the temperature, i.e. the change in enthalpy measured as the deviating course of the heat flow from the base line. The base line is understood to mean the (linear) part of the curve in which no phase conversions take place. In this case, a linear correlation applies between the amount of heat supplied and the temperature. In the range in which melting processes take place, the heat flow increases by the necessary melting energy and the DSC curve rises. In the area in which most crystallites melt, the curve reaches a maximum and falls back down to the base line once all the crystallites have melted. The melting point is the highest point of the DSC curve, within the meaning of the present invention. In the context of the present invention, the start of the melting range is that temperature at which the DSC curve deviates from the base line and the DSC curve starts to rise.

To determine the melting point and the start of the melting range, the DSC curve is plotted with a heating and cooling speed of 10 K/1 min in the 20 to 200° C. range. To determine the melting point and melting range of the polymers, the second heating curve is evaluated as usual.

β-Content of the Precursor Film

The β-content of the precursor film is likewise determined by a DSC measurement, which is performed on the precursor film in the following way. The precursor film is heated to 220° C. in the DSC, initially at a heating rate of 10 K/min, and melted and cooled again. The crystallinity degree $K_{\beta,DSC}$ is determined as a ratio of the melt enthalpies of the β-crystalline phase ($H_\beta$) to the total melt enthalpies of the β- and α-crystalline phase ($H_\beta+H_\alpha$).

Density

The density is determined according to DIN 53 479, method A.

Permeability (Gurley Value)

The permeability of the films was measured using the Gurley tester 4110 according to ASTM D 726-58. This involves determining the time (in secs) needed for 100 cm$^3$ air to permeate the 1 inch$^2$ (6,452 cm$^2$) label surface. The pressure difference across the film in this case corresponds to the pressure of a 12.4 cm high water column. The time required then corresponds to the Gurley value.

Shut-Off Function

The shut-off function is determined by Gurley measurements before and after heat treatment at a temperature of 130° C. The film's Gurley value is measured as described earlier.

The film is then exposed to a temperature of 130° C. in the heating furnace for one minute. The Gurley value is subsequently determined again as described. The shut-off function comes into effect when, following heat treatment, the film displays a Gurley value that is at least 30% higher and/or when the Gurley value is at least 6000 secs following the heat treatment.

The invention is now explained by the following examples.

EXAMPLE 1

Following the coextrusion method, a three-layered precursor film was extruded from a flat-film extrusion die at an extrusion temperature of 240 to 250° C. This precursor film was first drawn on a cooling roller and cooled. The precursor film was then oriented in a longitudinal and transverse direction and finally fixed. The three-layered film had a layer structure comprising an external shut-off later/another layer/an external shut-off layer. The individual layers of the film had the following composition:

External shut-off layers with a thickness of 10 μm (first and second covering layer):

Approx. 75% by wt highly isotactic propylene homopolymerisate (PP) with a $^{13}$C-NMR isotacticity of 97% and an n-heptane-soluble proportion of 2.5% by wt (relative to 100% PP) and a melting point of 165° C.; and a melt flow index of 2.5 g/10 min at 230° C. and a load of 2.16 kg (DIN 53 735) and approx. 25% by wt propylene-ethylene-block copolymerisate II with an ethylene share of 18% by wt relative to the block copolymer and an MFI (230° C. and 2.16 kg) of 0.8 g/10 min and a melting point of 144° C., the melting range starts at 70° C. (DSC)

0.1% by wt Ca-pimelate as the β-nucleation agent

Other layer (internal base layer with a thickness of 30 μm):

Approx. 75% by wt highly isotactic propylene homopolymerisate (PP) with a $^{13}$C-NMR isotacticity of 97% and an n-heptane-soluble proportion of 2.5% by wt (relative to 100% PP) and a melting point of 165° C. and a melt flow index of 2.5 g/10 min at 230° C. and a load of 2.16 kg (DIN 53 735) and approx. 25% by wt propylene-ethylene-block copolymerisate I with an MFI (230° C. and 2.16 kg) of 5 g/10 min and a melting point (DSC) of 164° C., the melting range starts at 130° C. (DSC)

0.1% by wt Ca-pimelate as the β-nucleation agent

The film also contains the customary amounts of stabiliser and neutralisation agent in each layer.

The melted polymer mixture was drawn over a first draw-off roller and a further trio of rollers and solidified, after which it was stretched longitudinally, transversely and fixed, wherein the following conditions were selected in particular:

Extrusion: Extrusion temperature 245° C.
Draw-off roller: Temperature 120° C., dwell time 55, secs
Longitudinal stretching: Stretch roll T=90° C.
Longitudinal stretching by a Factor of 4
Transverse stretching: Heating fields T=130° C.
Stretching fields: T=130° C.
Transverse stretching by a Factor of 4

The porous film produced in this way was approx. 50 μm thick and displayed a density of 0.43 g/cm$^3$ and had a uniform white-opaque appearance. The Gurley value was 3000 secs. Following the furnace heat treatment at 130° C. for 1 min, the Gurley value was >10000 secs.

EXAMPLE 2

A film was produced as described in Example 1. Unlike Example 1, 45% by wt of the propylene block copolymer II were now used in the external shut-off layers. The proportion of the propylene homopolymer was reduced accordingly to 55% by wt. The composition of the internal base layer, as well as the layer thicknesses and process parameters, was left unchanged. The porous film produced in this way was approx. 50 μm thick and had a density of 0.46 g/cm$^3$, and a uniform white opaque appearance. The Gurley value was 4500 secs. Following the furnace heat treatment at 130° C. for 1 min, the Gurley value was >10000 secs.

EXAMPLE 3

A two-layered film with the following composition was produced using the process parameters described in Example 1
Shut-Off Layer of 15 μm
Approx. 30% by wt of the propylene block copolymer II, which was used in the covering layer in Example 1 and 70% by wt propylene homopolymer, which was used in Example 1
Second Layer of 15 μm
20% by wt of the propylene block copolymer, which was used in the internal base layer in Example 1
80% by wt of the propylene homopolymer, which was used in Example 1.
The porous film produced in this way was approx. 30 μm thick, had a density of 0.40 g/cm$^3$ and a uniform white-opaque appearance. The Gurley value was 2500 secs. After the furnace heat treatment at 130° C. for 1 min, the Gurley value was >10000 secs/100 cm$^3$.

EXAMPLE 4

A film was produced as described in Example 3. Unlike Example 3, the proportion of propylene block copolymer I in the second layer was increased to 50% by wt and the proportion of propylene homopolymer was reduced accordingly to 50% by wt. The composition of the internal base layer and also the layer thicknesses and process parameters remained unchanged from Example 3.
The porous film produced in this way was approx. 50 μm thick, had a density of 0.41 g/cm$^3$ and a uniform white-opaque appearance. The Gurley value was 3000 secs. After the furnace heat treatment at 130° C. for 1 min, the Gurley value was >10000 secs.

COMPARATIVE EXAMPLE

A film was produced as described in Example 1. Unlike Example 1, the composition of the two external layers was changed:
External layers: (first and second covering layer):
approx. 75% by wt highly isotactic propylene homopolymerisate (PP) with a $^{13}$C-NMR isotacticity of 97% and an n-heptane-soluble proportion of 2.5% by wt (relative to 100% PP) and a melting point of 165° C. and a melt flow index of 2.5 g/10 min at 230° C. and a load of 2.16 kg (DIN 53 735) and
approx. 25% by wt propylene-ethylene-block copolymerisate I with an MFI (230° C. and 2.16 kg) of 5 g/10 min and a melting point (DSC) of 164° C., the melting range starts at 130° C. (DSC)
0.1% by Wt Ca-Pimelate as the β-Nucleation Agent
The composition of the base layer, as well as the layer thicknesses and the process parameters, was not changed. The porous film produced in this way was approx. 50 μm thick and had a density of 0.40 g/cm$^3$ and a uniform white opaque appearance. The Gurley value was 500 secs. Following the furnace heat treatment at 130° C. for 1 min the Gurley value was 550 secs.
Evidence of a shut-off effect is produced when a Gurley value of 10,000 secs was reached. The measurement was therefore discontinued after 10,000 secs and shows that the actual Gurley value is above 10,000 secs.
The Gurley values before and after the heat treatment and also the mechanical strengths of the films are summarised in the table below:

TABLE

| Example | Gurley value secs. | Gurley value secs. after heat treatment | E-module in MD/TD N/mm$^2$ |
|---|---|---|---|
| VB | 500 | 550 | 820/1780 |
| 1 | 3000 | >10000 | 800/1750 |
| 2 | 4500 | >10000 | 780/1740 |
| 3 | 2500 | >10000 | 740/1690 |
| 4 | 3500 | >10000 | 720/1590 |

The invention claimed is:
1. A biaxially oriented microporous film composed of at least two coextruded layers encompassing an external shut-off layer and second layer, wherein both layers contain a mixture of propylene homopolymer and propylene block copolymer and β-nucleation agent, wherein the propylene block copolymer of the second layer (propylene block copolymer I) has a melting point exceeding 140° C. and the propylene block copolymer of the external shut off layer (propylene block copolymer II) has a melting range starting a temperature ranging from 50 to 120° C. and the melting point of the propylene block copolymer I is greater than a melting point of the propylene block copolymer II and wherein the melting point of the propylene block copolymer I is 150 to 170° C. and a melting range starts at a temperature of over 120° C. and the melting point of the propylene block copolymer II is below 150° C.
2. The film according to claim 1, wherein the propylene block copolymer II has an ethylene or butylene content of 10 to 25% by wt and a melt flow index of 0.1 to 10 g/10 min (at 2.16 kg and 230° C.).
3. The film according to claim 1, wherein the propylene block copolymer I has an ethylene or butylene content of 1 to 20% by wt and a melt flow index of 1 to 20 g/10 min (at 2.16 kg and 230° C.).
4. The film according to claim 1, wherein the second layer contains 50 to 80% by wt propylene homopolymer, 20 to 50% by wt block copolymer I and 50 to 10,000 ppm β-nucleation agent and the external shut-off layer contains 50 to 80% by wt propylene homopolymer, 20 to 50% by wt block copolymer II and 50 to 10,000 ppm β-nucleation agent.
5. The film according to claim 1, wherein the propylene homopolymer is a high isotactic polypropylene with a chain isotacticity ($^{13}$C-NMR) of 95 to 98%.
6. The film according to claim 1, wherein the β-nucleation agent is a calcium salt of pimelic acid or of suberic acid or a carboxamide.
7. The film according to claim 1, wherein the density of the film ranges from 0.2 to 0.6 g/cm$^3$.
8. The film according to claim 1, wherein the film has a Gurley value of 100 to 5000 secs/100 cm$^3$.
9. The film according to claim 1, wherein after one minute's heat treatment at a temperature of 130° C. the film has a Gurley value that is at least 30% higher than the film's Gurley value before the heat treatment.

10. The film according to claim 1, wherein the film is three-layered and has external shut-off layers on both sides and the second layer forms the film's base layer.

11. The film according to claim 10, wherein the film is four or five-layered and the base layer is another of the film's shut-off layers and an intermediate layer(s) is/are made from the polypropylene homopolymer and the propylene block copolymer I and the β-nucleation agent.

12. The film according to claim 1, wherein the film is four or five-layered and one or both intermediate layers is/are made from the polypropylene homopolymer and the propylene block copolymer I and the β-nucleation agent.

13. The film according to claim 1, wherein the external shut-off layer has a thickness of 3 to 30 μm.

14. The film according to claim 1, wherein the film has a thickness of 15 to 100 μm.

15. A separator in a primary or a secondary battery which comprises the film according to claim 1.

16. The film according to claim 1, wherein the β-nucleation agent is a calcium acid of a dicarbonic acid or a dicarboxamide.

17. The film according to claim 1, wherein the β-nucleation agent is N,N-dicyclohexyl-2,6-naphthalene dicarboxamide.

18. The film according to claim 1, wherein the melting point of the propylene block copolymer II is below 150° C. and the melting range starts at a temperature ranging from 50 to 110° C.

19. The film according to claim 1, wherein the melting point of the propylene block copolymer I is 150 to 165° C.

20. The film according to claim 1, wherein the melting point of the propylene block copolymer I is 150 to 160° C., has an ethylene content between 1 and 10% by weight and a melt flow index from 1 to 10 g/min (at 2.16 kg and 230° C.).

21. The film according to claim 20, wherein the melting point of the propylene block copolymer II is 55 to 100° C. and has an ethylene content between 10 and 25% by wt. and a melt flow index from 0.3 to 5 g/10 min (at 2.16 kg and 230° C.).

* * * * *